US007669946B2

(12) United States Patent
Tucker et al.

(10) Patent No.: US 7,669,946 B2
(45) Date of Patent: Mar. 2, 2010

(54) INK JET PRINTING SYSTEM FOR PRINTING COLORED IMAGES ON CONTACT LENSES

(75) Inventors: Robert Carey Tucker, Arlington Heights, IL (US); David Hyink, Elmhurst, IL (US)

(73) Assignee: Novartis AG, Basel (CH)

( * ) Notice: Subject to any disclaimer, the term of this patent is extended or adjusted under 35 U.S.C. 154(b) by 102 days.

(21) Appl. No.: 11/801,282

(22) Filed: May 9, 2007

(65) Prior Publication Data

US 2007/0273740 A1 Nov. 29, 2007

Related U.S. Application Data

(63) Continuation of application No. 10/287,757, filed on Nov. 4, 2002, now abandoned.

(60) Provisional application No. 60/347,995, filed on Nov. 7, 2001.

(51) Int. Cl.
*B41J 29/38* (2006.01)

(52) U.S. Cl. ................................ 347/2; 347/3; 347/106

(58) Field of Classification Search ................. 347/2-3, 347/8, 14, 19, 106; 101/35; 351/162
See application file for complete search history.

(56) References Cited

U.S. PATENT DOCUMENTS

| | | | | |
|---|---|---|---|---|
| 4,038,264 | A | 7/1977 | Rostoker et al. | 260/79.3 |
| 4,266,232 | A | 5/1981 | Julianna, Jr. et al. | 346/140 |
| 4,981,487 | A | 1/1991 | da Costa | 8/507 |
| 5,329,293 | A | 7/1994 | Liker | 347/11 |
| 5,815,282 | A | 9/1998 | Kano | 358/296 |
| 5,926,195 | A | 7/1999 | Domhoff et al. | 347/87 |
| 6,284,161 | B1 | 9/2001 | Thakrar et al. | 264/1.7 |
| 6,315,410 | B1 | 11/2001 | Doshi | 351/162 |
| 2001/0003871 | A1 | 6/2001 | Patton et al. | 33/18.1 |
| 2001/0005942 | A1 | 7/2001 | Patton et al. | 33/18.1 |
| 2001/0050753 | A1 | 12/2001 | Tucker | 351/177 |
| 2002/0140900 | A1 | 10/2002 | Streibig | 351/162 |

(Continued)

FOREIGN PATENT DOCUMENTS

| | | |
|---|---|---|
| EP | 0 272 101 | 2/1991 |

(Continued)

OTHER PUBLICATIONS

International Search Report.

*Primary Examiner*—Lam S Nguyen
(74) *Attorney, Agent, or Firm*—Sheng-Hsin Hu; Jian Zhou

(57) ABSTRACT

The present invention provides a method for making colored contact lenses and an apparatus for implementing the method of the invention. The apparatus of the invention comprises a securing means for holding a contact lens or a portion of a mold for making the contact lens, a printer head, wherein the printer head comprises one or more nozzles each of which is capable of jetting droplets of color liquid independent of each other under control of a computer system; a positioning means for precisely positioning the printer head at each of a plurality of predetermined positions, one at a time, on a surface of the contact lens or the mold portion under control of the computer system. The method and apparatus of the invention are useful for producing colored contact lenses having high quality color images thereon.

17 Claims, 6 Drawing Sheets

124
122
126
110
170
140
160
150

U.S. PATENT DOCUMENTS

| | | | | |
|---|---|---|---|---|
| 2002/0196409 | A1 | 12/2002 | Jani | 351/162 |
| 2003/0002011 | A1 | 1/2003 | Streibig | 351/162 |
| 2003/0007056 | A1 | 1/2003 | Hayashi | 347/103 |
| 2003/0007122 | A1 | 1/2003 | Streibig | 351/162 |

FOREIGN PATENT DOCUMENTS

| | | |
|---|---|---|
| EP | 0 482 836 | 3/1995 |
| EP | 0 482 837 | 3/1995 |
| JP | 8-112566 | 5/1996 |
| WO | WO 01/96908 | 12/2001 |

INK JET PRINTING SYSTEM FOR PRINTING COLORED IMAGES ON CONTACT LENSES

This application is a continuation of U.S. patent application Ser. No. 10/287,757, filed Nov. 4, 2002, has been abandoned, which claims the benefit under USC §119 (e) of U.S. provisional application No. 60/347,995 filed Nov. 7, 2001, incorporated by reference in its entirety.

The present invention generally relates to systems and methods for making colored contact lenses. More specifically, the present invention relates to a digital printing system for printing a color image on curved surfaces of contact lenses or molds for making contact lenses. In addition, the present invention provides a manufacturing system and method for printing color images on curved surfaces of contact lenses or molds for making contact lenses.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers.

Presently, methods of printing inks onto contact lenses involve clichéink transfer printing. A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicon that can vary in elasticity. The properties of the silicone material permit the inks to stick to the pad temporarily and fully release from the pad when it contacts the contact lens.

There are several disadvantages associated with using cliché ink transfer printing to color contact lenses. This method lacks consistency. Slight differences in the silicone pad can cause wide variation in image quality, effecting dot resolution and color reproducibility. Further, multiple color layering is difficult and time consuming. Further still, the design and printing process using this method is slow. After an image is fully designed, it can take about two weeks before that image is etched onto a cliché. The set-up is painstakingly detailed and lengthy when more than one color is going to be printed on the lens using this method. The difficulty and slowness of this printing method inhibits business strategies, making it difficult to offer consumers a chance to design and print their own contact lenses at the point of purchase.

Ink-jet printing method may be used to replace the above-mentioned methods for printing colored images with high quality on a contact lens. However, current ink-jet printing technologies and systems are designed to print colored images on a flat object such as papers by moving an ink jet head (or a part) in a simple x-y-z translation (Cartesian) motion. These systems and methods in the prior art are not suitable for printing colored images with high quality on objects with curved surfaces to be printed, such as hemispherical contact lenses or molds for making contact lenses, especially in an industrial setting for high-throughput production of colored contact lenses. Therefore, there are needs for ink-jet printing methods and systems capable of printing colored images on curved articles. There are also needs for printing methods and systems that can be used in the high-throughput production of colored contact lenses.

SUMMARY OF THE INVENTION

The systems and methods of the present invention address at least some of the difficulties in the prior art.

In one aspect of the invention, a method for printing a color image on a curved surface of an article comprises under control of a computer system: (a) positioning precisely a printer head at each of a plurality of predetermined positions, one at a time, on the curved surface of the article while keeping a relatively constant distance between the printer head and the curved surface of the article, wherein the printer head comprises one or more nozzles each of which is capable of jetting droplets of color liquid independent of each other; and (b) dispensing one or more drops of color liquid from the printer head, one drop from one nozzle, on the curved surface of the article at each of the predetermined positions so as to produce the color image on the curved surface of the article.

In another aspect of the invention, a printing apparatus for making colored contact lenses comprises: a securing means for holding a contact lens or a portion of a mold for making the contact lens; a printer head, wherein the printer head comprises one or more nozzles each of which is capable of jetting droplets of color liquid independent of each other under control of a computer system; a positioning means for precisely positioning the printer head at each of a plurality of predetermined positions, one at a time, on a surface of the contact lens or the mold portion under control of the computer system.

In still another aspect of the invention, a method for automatically printing color images on articles comprises: (1) continuously transporting the articles along a predetermined path to transport each of the articles, one at a time, into a printing station comprising a printer head having one or more nozzles for jetting droplets of color liquid; (2) each time one of the curved articles moves into the digital printing system, (a) activating a positioning means to position precisely the printer head at each of a plurality of predetermined positions, one at a time, on the curved surface of the article, and (b) dispensing one or more drops of color liquid, one drop from one nozzle, on the curved surface of the article at each of the predetermined positions so as to print a color image on each of the articles.

In a further aspect of the invention, a system for automatically printing color images on articles each having a curved surface comprises: at least one printing station comprising a printer head having one or more nozzles each of which is capable of ejecting droplets of colored liquid independent of each other, a positioning means to precisely position the printer head at each of a plurality of predetermined positions, one at a time, on the curved surface of each of the articles; transporting means to continuously move the articles along a predetermined path to transport each of the articles, one at a time, into the printing station; and a computer system for controlling operation of the printing station and the transporting means.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF THE PREFERRED EMBODIMENTS

Figure 1:
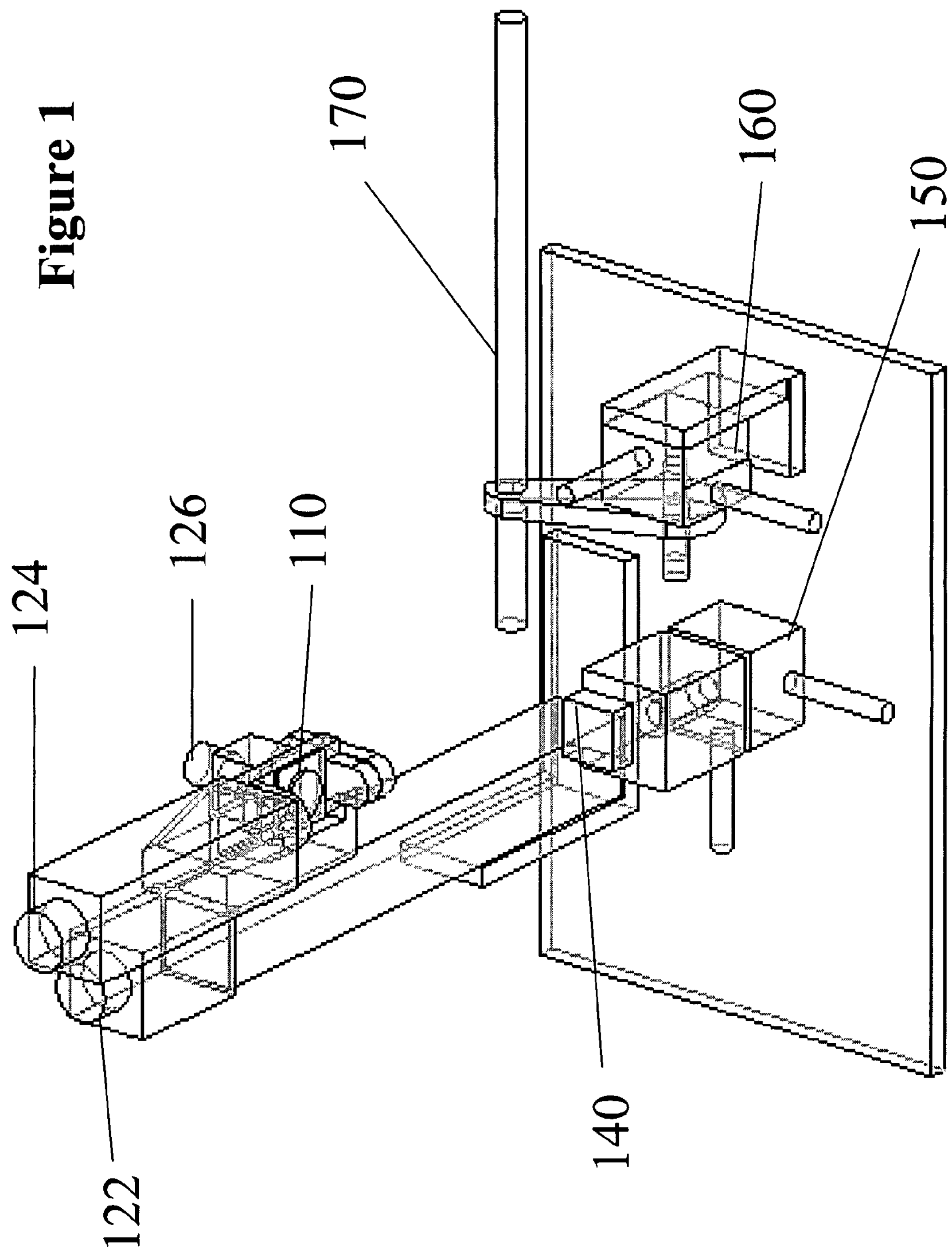
FIG. 1 schematically depicts a printing apparatus for making colored contact lenses according to a preferred embodiment of the invention.

In general, the present invention is directed to methods and systems for making colored contact lenses. "A colored contact lens" refers to a contact lens (hard or soft) having a color image printed thereon. A color image can be a cosmetic pattern, for example, iris-like patterns, WILD EYE™ patterns, made-to-order (MTO) patterns, and the like; an inversion mark that allows a user to handle and insert easily a contact lens, for example, a FRESHLOOK™ contact lens (CIBA Vision); or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

"Colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, pearlescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

"Pearlescence" means having a pearly luster; resembling a pearl in physical appearance; or having a nearly neutral slightly bluish medium gray color.

"Pigment" means a powdered substance that is suspended in a liquid in which it is relatively insoluble. Pigments are used to impart color by reflecting light.

Nearly any pigment can be used in the present invention, so long as it can be used in an apparatus as described below. Preferred pigments include fluorescent pigments, phosphorescent pigments, pearlescent pigments, and conventional pigments. Pigments can include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, titanium dioxides, etc. See Marmiom DM Handbook of U.S. Colorants for a list of colorants that may be used with the present invention.

Alternatively, a colored contact lens can be produced by first printing a high-quality color image on an optical surface of a mold to be used for molding a contact lens, using methods and systems of the invention, and then curing a polymerizable mixture in the mold containing the color image so as to transfer the color image onto the contact lens made in that mold. For example, methods for making a colored contact lens, disclosed in U.S. Pat. No. 5,116,112 and U.S. Pat. No. 6,284,161 (herein incorporated by reference in their entireties), involve coating a colored liquid in a mold for making a contact lens onto a surface thereof where the iris portion of the lens is formed to produce a colored film providing a pattern thereon which film contains a surface exposed to the interior of the mold and a surface in contact with the mold; and charging the mold with the lens-forming liquid used to form the body of the lens while maintaining the colored film in the iris portion and configuring the lens-forming liquid about the colored film whereby the surface of the film becomes integral with the body of the lens and surface of the film becomes part of the outer surface of the lens when the molded lens is removed from the mold.

Methods of manufacturing mold sections for cast-molding a contact lens are generally well known to those of ordinary skill in the art. The process of the present invention is not limited to any particular method of forming a mold. In fact, any method of forming a mold can be used in the present invention. However, for illustrative purposes, the following discussion has been provided as one embodiment of forming a mold on which a color image can be printed in accordance with the present invention.

In general, a mold comprises at least two mold sections (or portions) or mold halves, i.e. first and second mold halves. The first mold half defines a first optical surface and the second mold half defines a second optical surface. The first and second mold halves are configured to receive each other such that a lens forming cavity is formed between the first optical surface and the second optical surface. The first and second mold halves can be formed through various techniques, such as injection molding. These half sections can later be joined together such that a cavity forms therebetween. Thereafter, a contact lens can be formed within the cavity of the mold sections using various processing techniques, such as ultraviolet curing.

Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, and PMMA can be used. Other materials that allow UV light transmission could be used, such as quartz glass.

Once a mold is formed, a color image can be printed on the inner surface of one or both mold portions by using methods and systems of the invention. The inner surface of a mold portion is the cavity-forming surface of the mold and in direct contact with lens-forming material. A color image can be printed on the mold portion defining the posterior (concave) surface of a contact lens or on the mold section defining the anterior surface of a contact lens or on both mold portions.

Once a color image is printed on one or both mold portions, a lens material can then be dispensed into a cavity formed by the connection of the mold halves. In general, a lens material of the present invention can be made from any polymerizable material. In particular, when forming a contact lens, the lens material may be an oxygen-permeable material, such as flourine- or siloxane-containing polymer. For example, some examples of suitable substrate materials include, but are not limited to, the polymeric materials disclosed in U.S. Pat. No. 5,760,100 to Nicolson et al., which is incorporated herein by reference. The lens material can then be cured, i.e. polymerized, to form a contact lens. One embodiment of such a process is disclosed in U.S. Pat. No. 5,894,002 to Boneberger et al., which is herein incorporated by reference.

One embodiment of the invention is a method for printing a color image on a curved article comprises under control of a computer system: (a) positioning precisely a printer head at each of a plurality of predetermined positions, one at a time, on the curved surface of the article while keeping a relatively constant distance between the printer head and the curved surface of the article, wherein the printer head comprises one or more nozzles each of which is capable of jetting droplets of color liquid independent of each other; and (b) dispensing one or more drops of color liquid from the printer head, one drop from one nozzle, on the curved surface of the article at each of the predetermined positions so as to produce the color image on the curved surface of the article.

As used herein, "an article" refers to any article having a curved surface. Preferably, an article is a contact lens (hard or soft) or a mold for making a contact lens.

"A color liquid" refers to a liquid that comprises at least one colorant. When an ink jet is used, the color liquid is an ink.

Preferably, a color liquid comprises at least one pigment. Pigment(s) should be much smaller than a nozzle of a printer head to prevent clogging during the printing process. Generally, this means that preferred pigments are 3 microns or smaller. Larger pigments can be ground into smaller particles to reduce potential clogging. Preferred methods of reducing a pigment's particle size include high speed mixers, Kady Mills, colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art.

A color liquid can also comprises one or more components selected from the group consisting of solvents, surfactants, dispersants, monomers, polymers, thickeners, diluents, polymerization initiators, binders, humectants, antimicrobial agents, antioxidant agents, anti-kogating agents, and other additives known in the art.

A solvent can be water or any appropriate organic or inorganic solvent such as isopropanol, acetone, methanol, glycols, ketones, esters, cyclopentanone and the like. A color liquid can contain many solvents.

"A dispersant" refers to a dispersant, as that term is known in the art, that is a surface active agent added to a suspending medium to promote the distribution and separation of fine or extremely fine solid particles. Examples of dispersants include, but are not limited to, Tergitol series from Union Carbide, polyxylated alkyl ethers, alkyl diamino quarternary salts, and the like.

"A monomer" means a low molecular weight compound that can be polymerized. Low molecular weight typically means average molecular weights less than 700 Daltons. Examples of monomers include, but are not limited to, HEMA (2-hydroxyethyl methacrylate), chlorosilanes, methoxysilanes, methacryloxyethyltrimethoxylsilane, methacryoxyethylmethyldimethoxysilane, methacryloxyethyldimethylethoxysilane, methacryloxypropylmethyldichlorosilane, methacryloxypropyltrichlorosilane, and 3-methacryloxypropyldimethylchlorosilane.

A "macromer" refers to medium and high molecular weight compounds or polymers that contain functional groups capable of further polymerization. Medium and high molecular weight typically means average molecular weights greater than 700 Daltons.

"Polymer" means a material formed by polymerizing one or more monomers.

"A thickener" refers to a chemical that is used to increase the viscosity of a liquid or a partial liquid mixture or a solution such as that term is known in the art. Examples of a thickener are polyvinyl alcohols, polysaccharides, and the like.

"A binder" refers to a binding polymer that interacts with crosslinkers to trap or bind colorants onto or into a lens such as that term is known in the art. Examples of binders include polymers containing functional groups selected from at least one of acrylate, —COOH, —OH, and —NH—R (R═H, or $C_1$ to $C_8$ alkyl).

"A humectant" refers to a compound that removes water (or humidity) from ink such as that term is known in the art. Examples of humectant include ethylene glycol, diethylene glycerol and 1,3-diozane-5,5-dimethanol.

"A polymerization initiator" refers to a chemical that can start a polymerization reaction. A polymerization initiator can be a photoinitiator or a thermal initiator. A photoinitiator is a chemical that initiates polymerization reaction by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173®, Darocur 2959®, and CIBA IRGACURE 2959. A thermal initiator is a chemical that initiates polymerization reaction by the use of heat energy.

"A anti-kogating agent" refers to a chemical that can reduce deposits known as "kogation" being formed on the exposed surface of the heater element (resistor element) in thermal ink-jet printers. "Kogation" is commonly defined as the build-up of residue (koga) on the resistor surface.

"A crosslinking agent" refers to a crosslinkers as they are known in the art, such as, ethylene glycol dimethacrylate (EGDMA), diethylene glycol dimethacrylate, ethyleneglycol diacrylate, allyl methacrylates, allyl acrylates, 1,3-propanediol dimethacrylate, 1,6-hexanediol dimethacrylate, 1,4-butanediol dimethacrylate, polyethyleneoxide mono- and diacrylates, ethyleneglycol dimethacrylate (EGDMA) and 1,4-butanediol diacrylate (BDDA).

Some suitable antimicrobial materials include polyquaternary ammonium compounds, such as those described in U.S. Pat. No. 3,931,319 to Green et al. (e.g. "POLYQUAT"), which is incorporated herein by reference. Other antimicrobial or antibacterials that can be utilized in the present invention are peptides, other polyquats, mucin, mucin mimics, glycopeptides, glycoproteins, silk proteins, cellulose, dextran or other anti-microbial or anti-bacterial entities. Still other examples of such anti-bacterials or ant-microbials are disclosed in U.S. Pat. No. 5,866,113 to Hendriks et al. and U.S. Pat. No. 5,891,506 to Keogh, which are incorporated herein by reference.

Any ink jet printer can be used as a printer head with the present invention so long as it can be configured according to the systems and methods of the invention to print the inks on articles that have curved surfaces. A preferred ink jet printer is either drop-on-demand (DOD) or continuous-jet. Many continuous ink jet printers that could be used are commercially available from companies such as Domino-Amjet, Videojet, Scitex Digital Printing, Willet, Linx, Iris Graphics, Stork, and Dupont. Many DOD printers that could be used are commercially available from companies such as Epson, Xaar, Hitachi, Spectra, Tektronix, Canon, Hewlett-Packard, Lexmark, Olivetti, Xerox, Panasonic, VUTEk, and NEC.

A preferred inkjet printer can print pixels of less than 150 microns in diameter, preferably less than 100 microns in diameter, more preferably less than 75 microns. Pixel size is measured using standard microscopy techniques, which are well known to those of skill in the art. A preferred ink jet printer can space the pixels less than 80 microns from each other, preferably less than 50 microns from each other. To achieve this result, it is preferred that the drops of ink that are emitted from the nozzle have a volume of less than 100 picoliters, preferably less than 50 picoliters, and more preferably, less than 10 picoliters. A person skilled in the art will understand that an ink jet nozzle of ink printer head is sized to form drops of the preferred volume given the ink viscosity and thermal forces.

A printer head preferably comprises one column of nozzles, more preferably two columns of nozzles, even more preferably three columns of nozzles, each of the columns of nozzles dispensing a single color liquid. Such printer with two or more columns of nozzles can be used to print a color image having two or more colors. The color used in the image can be derived from a mixture of separate colors, such as two or more separate color, three or more separate color, or four or more separate colors. A person skilled in the art will know how to producing a wide range of colors on an image from a set of three or more separate colors. For example, in the color printing industry, process coloring is often used, in which separate colors are placed next to each other or overlaid on top of each other. When perceived by eye from a distance, the reflected light reflected would be mixed to form the appearance of new colors. Alternatively, separate colors, e.g., cyan, magenta and yellow, can be used to generate a wide array of different colors by physically mixing them in different proportions.

Preferably, each of columns of nozzles is configured to cover at least the width of an annulus zone that comprises a printing area on a contact lens or a mold portion. The center of the annulus zone is the apical center of the surface of the contact lens or the mold portion.

More preferably, each of columns of nozzles is configured to cover at least the width of a circular zone that comprises a printing area on a contact lens or a mold portion. The center of the annulus zone is the apical center of the surface of the contact lens or the mold portion.

A printer head used in the invention preferably has a printing surface having a curvature that can accommodate the curvature of a surface to be printed thereon. "A printing surface of a printer head" refers to the surface comprising nozzles.

Positioning of a printer head on a curved surface of an article (e.g., a contact lens or a mold portion) can be carried out by moving the printer head or the article or both, according to one of the below-described methodologies and the like. The choice of one methodology for positioning generally depends on one or more factors such as the printing quality of a color image, printing efficiency, and the column size and/or configuration of a printer (namely the printing area which can be covered by a printer head).

One preferred positioning methodology is to keep a printer head (or a contact lens or mold portion) stationary while moving linearly an article (e.g., a contact lens or a mold) along a translational axis, rotating the printer head (or the contact lens or mold portion) around a rotational axis that passes through the apical center of the curved surface of the article, and tilting the rotational axis at various positions. By keeping the printer head stationary in this positioning methodology, one can minimize adverse effects of vibrational or kinetic noise upon the ink jet meniscus or fluid reservoir. This preferred positioning methodology may be applicable to any printer head regardless of the column size and/or configuration of a printer head and may be able to maintain relatively-constant jetting path lengths of color liquid (namely the distance between a nozzle and the surface of the article to be printed). A high quality color image can be produced on a curved surface by using this methodology. Another preferred positioning methodology is one dimensional moving of an article or printer head while dispensing drops of color liquid in a timed sequence. As used herein, "one dimensional moving of an article or a printer head" refers to a movement where an article (or a printer head) is slid at a constant velocity in one direction directly under a printer head (or directly above an article to be printed thereon). "Dispensing drops of color liquid in a timed sequence" refers to that a plurality of sets of drops of color liquid are dispensed in a timed sequence, one set of drops at a time and having constant or variable time intervals between two sets of drops of color liquid. Such positioning methodology can be further illustrated by the following example. An article, which is properly aligned so that the printing area on the surface of the article can pass directly under a printer head, is moved at a constant velocity under the printer head. A position sensor transmits a signal to a computer system to set up a time zero and initiate dispensing of drops of color liquid in a timed sequence once it detects that the article has entered the printing area. The computer system may allow a certain time to elapse before beginning printing in the printing area on the article and then controls the printer head to dispense a first column of droplets of color liquid in a controlled pattern at a first position. After a time delay, the second row of droplets of color liquid is dispensed at a second different position of the constantly moving article. This process continues with a constant or variable time delay between rows until the last row of droplets of color liquid is dispensed at the last position of the constantly moving article, so that an entire color image pattern is reproduced on the article. In this preferred positioning methodology, a plurality of predetermined positions on the article is precisely determined by the time zero, time delay and moving velocity of the article. Such positioning methodology may have relatively high printing efficiency, may produce relatively high quality color images, and may be easily and preferably implemented in a mass production environment. However, such printing methodology may require that a printer head comprises one or more columns of nozzles, each column of nozzles that cover at least the width of a printing area on an article, for example, at least the width of a circular zone that comprises a printing area on a contact lens or a mold portion.

Another preferred positioning methodology is to rotate an article (or a printer head) around a rotational axis θ that passes through the apical center of the curved surface of the article in a direction normal to the curved surface. Such positioning methodology is applicable to a printer that comprises one or more columns of nozzles that cover at least half the width of a printing area on an article, for example, at least the width of an annulus zone that comprises a printing area on a contact lens or a mold portion.

For example, a printer head, which comprises one or more columns of nozzles, is used to print an iris pattern in a non-optical annul zone of the posterior surface of a contact lens. The column size of the printer is big enough to cover only the width of the annulus zone to be printed thereon. The printer head is kept stationary at a tilt angle with respect to the optical axis of the contact lens (i.e., rotational axis), so that the printing surface of the printer head is in parallel with a surface tangent to the annulus zone. Each of nozzles can have a relatively constant jetting path length of color liquid. Positioning of such printer head on the posterior surface of the contact lens can be carried out by rotating the contact lens around the rotational axis θ while keeping the printer head stationary. Similarly, such methodology can be more easily adapted when using a printer head having a column size that is equal or larger than the diameter of the outmost ring of the annulus zone (i.e., whole width of a printing area or a circular zone). Preferably, the printer head has a printing surface with a curvature accommodating the curvature of the surface to be printed thereon of the article. With this preferred feature of the printer head, the jetting path length of color liquid can be kept almost constant among all nozzles.

The above-described method of the invention for printing a color image on an article may preferably further comprise a step of converting a two dimensional color image into a set of control signals for printing the color image on a curved surface of the article.

It is known in the art that any two dimensional color image can be represented by a matrix of discrete and/or blended color dots in a Cartesian coordinate system (x,y). A two-dimensional color image can be converted into a three dimensional color image, for example, by simply projecting the two-dimensional color image onto a curvature surface. Alternatively, a x-y Cartesian coordinate system can be converted into a spherical coordinate system or the like, for example, a (θ, ϕ, z) coordinate system. θ is a rotational axis that passes through the apical center of the surface to be printed on; ϕ is a tilting axis; z is a translational axis. Conversion can be performed approximately on the basis of hemispherical system.

Preferably, the density of dots is kept constant when converting a two-dimensional color image into a three dimensional color image, by adding and/or deleting dots in the dot matrix of the three-dimensional color image. For example, addition and deletion of dots in the conversion of a two-dimensional image into a three-dimensional image can be performed by using integration of software and a print head, which has a curvature printing surface accommodating a surface curvature of a contact lens or a mold portion and comprises at least a column of nozzles that are separated by a fixed space and configured to cover whole width of a printing area on a contact lens or a mold portion.

Another embodiment of the invention is a printing apparatus for making colored contact lenses. A printing apparatus of the invention comprises: a securing means for holding a contact lens or a portion of a mold for making the contact lens; a printer head which comprises one or more nozzles each of which is capable of jetting droplets of color liquid independent of each other; a positioning means for precisely positioning the printer head at each of a plurality of predetermined positions, one at a time, on a surface of the contact lens or the mold portion; and a computer system for controlling operation of the printer head and the positioning means.

FIG. 1 schematically depicts a printing apparatus for making colored contact lenses according to a preferred embodiment of the invention. Referring to FIG. 1, a contact lens or a mold portion is secured with a securing device 110 and can be moved along three axes by a moving assembly, which comprises a slide motor 122, a tilt motor 124 and a rotary motor 126. An ink jet head 140 is secured to a platform, which is stationary during printing process. The moving assembly and the ink jet head are controlled by a computer system, as shown schematically in FIG. 2. Optionally, a printing apparatus can comprise a microscope assembly 170 that is used in the calibration of the apparatus and QC.

Figure 2:
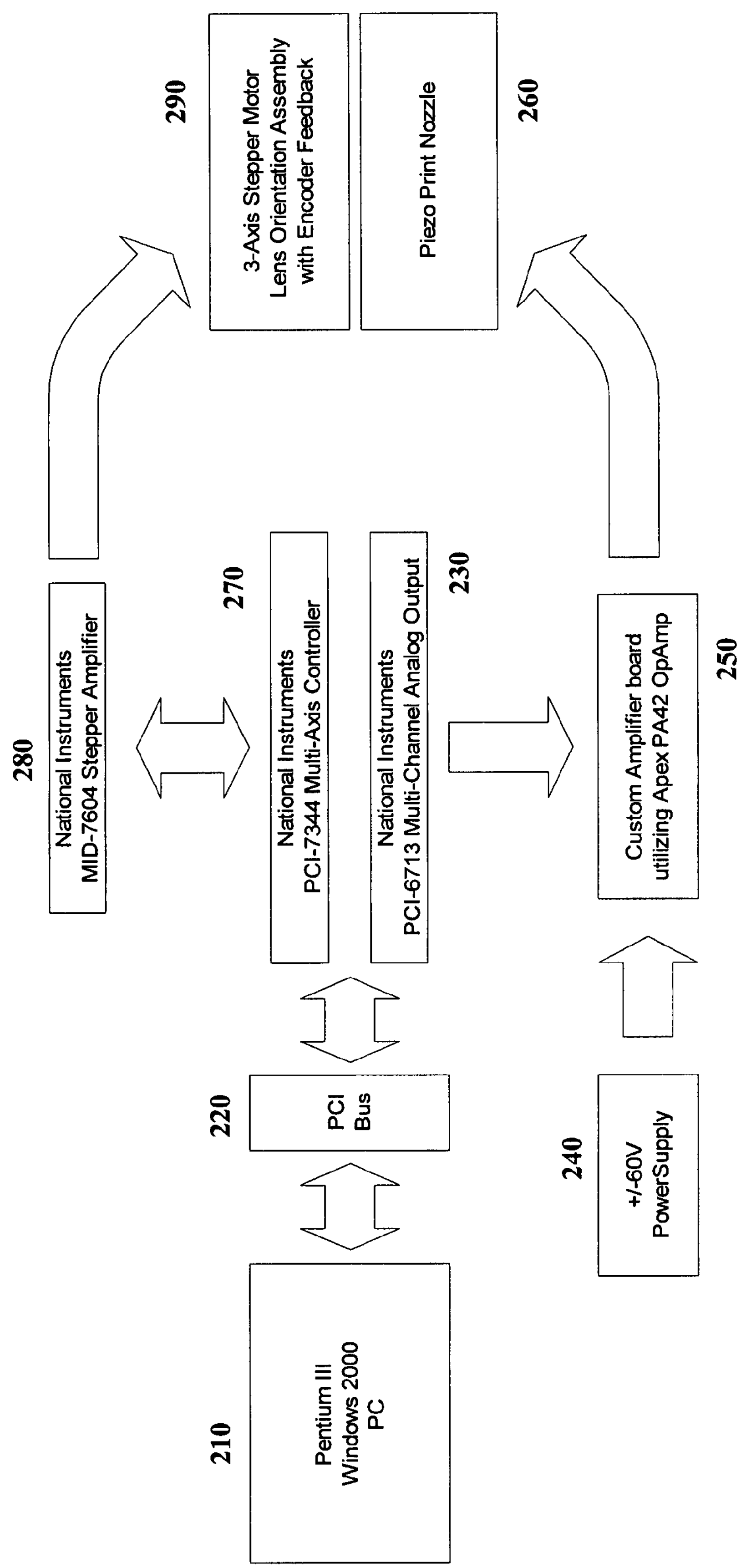
FIG. 2 is a schematic flow diagram of electronic signals in a printing apparatus for making colored contact lenses shown in FIG. 1.

Referring to FIG. 2, ejecting drops of liquid (firing) from an ink jet head such as a piezoelectric ink jet head 260 is controlled by a amplifier board 250 connected to an independent dual tracking ±60V-power supply 240. The amplifier board 250 is controlled by a multi-channel analog output board 230 connected to a Pentium III PC 210 via an interface 220. The PC 210 is also connected to a multi-axis controller 270, which controls the stepper motors 290 with the help of an electronic signal amplifier 280 and encoder feedback. This system allows direct computer control of the 3-axis stepper motor lens presentation system, complete with encoder feedback.

In a preferred embodiment, the printing apparatus comprises a printer head which comprises at least one column of nozzles that are configured to cover at least half width of a printing area, for example, an annulus zone, on a contact lens or a mold portion. In this preferred embodiment, the printer head can be tilted at an angle relative to a rotational axis θ that passes through the apical center of a curved surface of a contact lens or a mold portion in a direction normal to the curved surface, so that the printing surface of the printer head is in parallel with a surface tangent to the annulus zone. Positioning of such printer head on a surface of an article (a contact lens or a mold portion) can be carried out by rotating the article around the rotational axis θ while keeping the printer head stationary and constant distance between the surface of the article and each of the nozzles during printing. In a more preferred embodiment, the printer head further has a printing surface with a curvature accommodating the curvature of the surface to be printed thereon of the contact lens or the mold portion.

In another preferred embodiment, the printing apparatus comprises a printer head which comprises at least one column of nozzles that are configured to cover at least whole width of a printing area, for example, a circular zone, on a contact lens or a mold. In this preferred embodiment, the printer head can be placed horizontally (perpendicular to a rotational axis θ that passes through in normal direction the apical center of a curvature surface of a contact lens or a mold portion). Positioning of such printer head on a surface of an article (a contact lens or a mold portion) can be carried out by rotating the article around the rotational axis θ while keeping the printer head stationary and constant distance between the surface of the article and each of the nozzles during printing. More preferably, the printer head further has a surface with a curvature accommodating the curvature of the surface to be printed thereon of the contact lens or the mold portion.

In another preferred embodiment, the printing apparatus comprises a printer head which comprises at least one column of nozzles that are configured to cover at least whole width of a printing area, for example, a circular zone, on a contact lens or a mold. In this preferred embodiment, the printer head can be placed horizontally (perpendicular to a rotational axis θ that passes through in normal direction the apical center of a curvature surface of a contact lens or a mold portion). Positioning of such printer head on a surface of an article (a contact lens or a mold portion) can be one dimensional moving an article or printer head while dispensing drops of color liquid in a timed sequence. More preferably, the printer head further has a surface with a curvature accommodating the curvature of the surface to be printed thereon of the contact lens or the mold portion.

The positioning means either can be a motor assembly that is capable of moving an article or a printer head along three axis (e.g., along a translational axis, around a rotational axis and around a tilting axis) or capable of moving an article or a printer head moving close to each other along a translational axis and then rotating it around a rotational axis or can be a moving means that can move linearly the contact lens or the mold portion (or the printer head) at a constant velocity along one axis under the printer head (or above the contact lens or the mold portion) and a jetting-controlling means for controlling each of the nozzles to dispense drops of color liquid in a timed sequence, wherein time intervals between two drops from each of the nozzles are constant or variable. The jetting-control means can comprise electronic hardware and software known to a person skilled in the art.

In another preferred embodiment, the printing apparatus of the invention can further comprise at least one additional printer head. The additional printer head can comprise the above-described preferred features of a printer head. Positioning of the additional printer head is controlled by the computer system in coherence with the positioning of the first printer head to cover all printing area. For example, the printing apparatus comprises two identical printer heads. Each printer head comprises at least one column of nozzles that are configured to cover an annulus zone on a contact lens or a mold portion. Both the printer heads can be tilted at an angle relative to a rotational axis θ that passes through the apical center of a curved surface of a contact lens or a mold portion, so that the printing surface of each of the printer heads is in parallel with a surface tangent to the annulus zone. Positioning of such printer head on a surface of an article (a contact lens or a mold portion) can be carried out by rotating the article around the rotational axis θ while keeping the printer head stationary and constant distance between the surface of the article and each of the nozzles during printing. In a more preferred embodiment, both the printer heads further have printing surfaces with curvatures accommodating the curvature of the surface to be printed thereon of the contact lens or the mold portion.

The computer system can control each of nozzles in a printer head to independently eject droplets of color liquid and control the positioning means to precisely position the printer head at each of a plurality of predetermined positions, one at a time, on a surface of a contact lens or a mold portion.

Another embodiment of the invention is a method of making colored contact lenses in a mass production environment. More specifically, the invention provides a method of automatically printing color images on articles (contact lenses or mold portions), the method comprising: (1) continuously transporting the articles along a predetermined path to transport each of the articles, one at a time, into a printing station comprising a printer head having one or more nozzles for jetting droplets of color liquid; (2) each time one of the curved articles moves into the digital printing system, (a) activating a positioning means to position precisely the printer head at each of a plurality of predetermined positions, one at a time, on the curved surface of the article, and (b) dispensing one or more drops of color liquid, one drop from one nozzle, on the curved surface of the article at each of the predetermined positions so as to print a color image on each of the articles.

Preferably, the transporting step can include the steps of: positioning each of the articles in a respective location in a carrier and continuously moving the carrier along the predetermined path.

Preferably, the activating step can include the steps of: generating a start signal each time one of the articles moves into the printing station and transmitting the start signal to a computer system to activate the positioning means to precisely position the printer head over the curved surface of the article.

As described above, the printer head preferably comprises at least one of the following features: one or more column of nozzles; each of the columns of nozzles dispensing a single color liquid; each of columns of nozzles which are configured to cover at least half the width of a printing area on a contact lens or a mold; each of columns of nozzles which are configured to cover at least whole width of a printing area on a contact lens or a mold; and the surface of the print head having a curvature that can accommodate the curvature of a surface to be printed thereon.

The above-described positioning methodology can also used in the method of the invention for automatically printing color images on articles.

The printing station can comprise multiple printer heads. Such printing station with multiple printer heads can find particular use in batch processing to print many contact lenses in parallel in rapid succession. For example, a batch of eight lenses (one carrier) could be sent to eight printer heads. Lifts push the lens cup to put it in the vicinity of the printer heads. The cups could be rotated in a controlled fashion. The print heads would jet on and off based upon instructions sent from the computer system. The lifts would then lower the lenses back on their carrier. Then, the carrier would be sent through a system to print or spray the binding solution over the lenses. The lenses would then be sent to a curing process to heat and dry the lenses.

Another embodiment of the invention is a system for implementing the method of automatically printing color images on articles, the system comprising: at least one printing station comprising a printer head having one or more nozzles each of which is capable of ejecting droplets of colored liquid independent of each other, a positioning means to precisely position the printer head at each of a plurality of predetermined positions, one at a time, on the curved surface of each of the articles; transporting means to continuously move the articles along a predetermined path to transport each of the articles, one at a time, into the printing station; and a computer system for controlling operation of the printing station and the transporting means.

In a preferred embodiment, the printing station comprises a printer head which comprises at least one column of nozzles that are configured to cover at least half width of a printing area, for example, an annulus zone, on a contact lens or a mold portion. In this preferred embodiment, the printer head can be tilted at an angle relative to a rotational axis θ that passes through the apical center of a curved surface of a contact lens or a mold portion, so that the printing surface of the printer head is in parallel with a surface tangent to the annulus zone.

In another preferred embodiment, the printing station comprises a printer head which comprises at least one column of nozzles that are configured to cover at least whole width of a printing area, for example, a circular zone, on a contact lens or a mold. In this preferred embodiment, the printer head can be placed horizontally (perpendicular to a rotational axis θ that passes through the apical center of a curved surface of a contact lens or a mold portion in a direction normal to the curved surface).

Preferably, the transporting means can include a carrier that comprises one or more locations, each for holding one article.

Preferably, the printing station can further comprise an activating means such as a sensor for generating a start signal each time one of the articles moves into the printing station and transmitting the start signal to a computer system to activate the moving means to precisely position the printer head over the curved surface of the article. The sensor can detect if an article enters into the printing station.

More preferably, the system can further comprise two or more printing stations, each station comprising the above-described features. Such system with multiple printing stations can find particular use in batch processing to print many contact lenses in parallel in rapid succession.

The positioning means either can be a motor assembly that is capable of moving an article or a printer head along three axis (e.g., along a translational axis, around a rotational axis and around a tilting axis) or capable of moving an article or a printer head moving close to each other along a translational and then rotating it around a rotational axis or can be a motor that moves the article or the printer head at a constant velocity along one direction and a jetting-controlling means for controlling a timed sequence of dispensing of drops of color liquid. The jetting-control means can comprise electronic hardware and software known to a person skilled in the art.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

This example provides method for making a colored contact lens by first printing a color image on a mold portion (male mold) defining the posterior surface of a contact lens.

An apparatus, as depicted schematically in FIGS. 1 and 2, is designed to produce FreshLook™ (CIBA Vision) contact lenses by printing iris patterns onto male FreshLook polypropylene molds with recently developed ink jet inks for contact lenses, which are disclosed and claimed in a co-pending patent application, U.S. patent application Ser. No. 10/287,730, "Ink Formulations and Uses Thereof", herein incorporated by reference in its entirety.

The apparatus comprises a Micro Fab print head (50 μm diameter). It has been discovered that heating the ink to ~60° C. for 30 minutes followed by cooling may improve ink stability. Ink may show a sign of drying after a stagnation of about 20 minutes. The dried ink is easily removed by rinsing the tip of the head with water.

Piezoelectric firing is controlled by a custom amplifier board connected to an independent dual tracking ±60V-power supply. The amplifier board is controlled by a multi-channel analog output board connected to a Pentium III PC. This device allows the LabView software to directly control drop formation.

The PC is also connected to a multi-axis controller, which controls the stepper motors. This system allows direct computer control of the 3-axis stepper motor assembly with encoder feedback.

This apparatus has a print resolution identical to that for the current FreshLook™ product and comprise a three-axis stepper motor control for positioning. The printer head is kept stationary during printing to eliminate mechanical shock that would influence ink jetting. The printed patterns can be transferred to a Dailies™ lens or a FreshLook™ lens during polymerization to form colored contact lenses.

Figure 3:
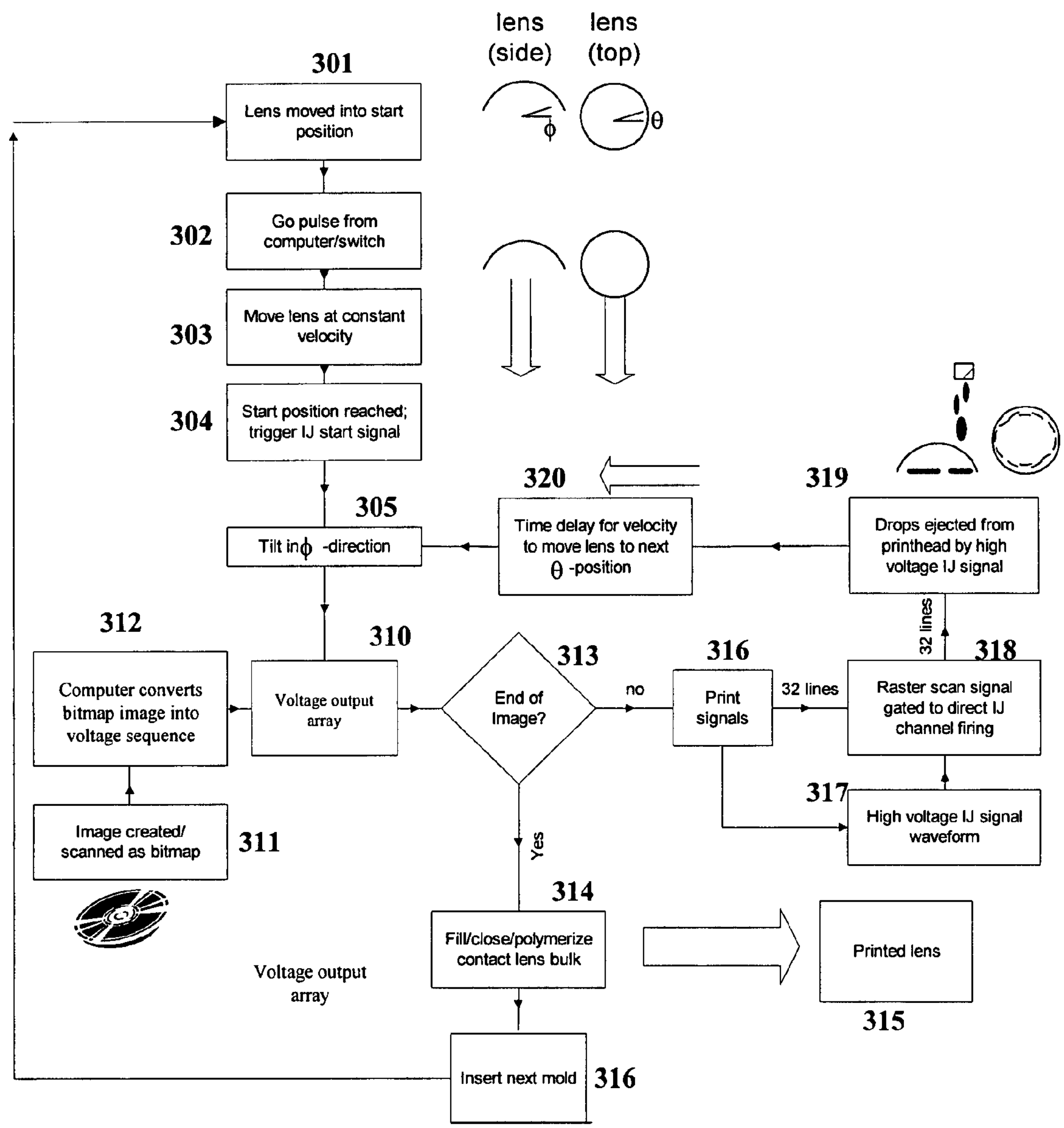
FIG. 3 is a schematic flow diagram of operation of the printing apparatus according to a preferred embodiment of the invention.

FIG. 3 schematically depicts a flow diagram of operation of the printing apparatus. All software is developed on a LabView platform. First, an optimized waveform is developed for the print and prime waveform using a program called "Pulse waveform generator single shot.vi". A square wave generator is manipulated by the user to obtain optimal jetting conditions. This waveform is then saved to the hard disk for later use. The print and prime waveforms are tested back-to-back in a program called "Output print prime waveform.vi" to verify jet control. Various print waveforms can be used, depending upon the nozzle size. One preferred waveform for the 50 μm nozzle is a bipolar waveform (+30 V, −30 V @39 μsec, 0 V @84 μsec). Note the sign usage to compensate for the inverting operational amplifier). Typically, each waveform is triggered at 40 msec intervals to ensure software control. To minimize tip drying, a priming waveform is applied over unprinted pixels, essentially a print waveform of low magnitude or long ramp times.

Images 311, which are created or scanned in a bitmap format, are manipulated to obtain the proper format for ink jet printing using a program called "BMP to IJ1 files.vi". For example, a 300×50 pixel image is drawn in a program such as Microsoft Paint and saved as a monochrome bitmap. The LabView program loads this image, converts it in step 312 to an array of voltage outputs 310, and stores it on disk. The voltage output array 310 can be read by the program "IJ1 file to OUTPUT.vi" to produce a voltage output at a certain frequency. The voltage output controls the time when the jet will fire. This system allows print speeds over 300 Hz, and is only limited by the speed of the PC.

The three stages are also controlled by the program "IJ1 file to OUTPUT.vi". The position and velocities of all stages are controlled to allow complex motion patterns to be performed. Tests are performed at 1190 rpm rotation speed, 80 rpm tilt speed. Still referring to FIG. 4, when a male mold is moved into start position in step 401, whole printing system is activated 302. The male mold is first moved linearly toward the printer head step 303 until the printing start position 304. Then, the male mold is tilted in Φ direction step 305. The computer retrieves data from a look-up table (voltage output array) 310 and checks if an image has been completed printed on the male mold in step 413. If the answer is no, the computer transmits the control signals 316, 317 and 318 that control the printer head in step 319 to eject drops of ink. The male mold is then moved to next 0 position in step 320 and followed by tilting in Φ direction step 305. If in step 413 the answer is yes, in step 414 the male mold having a printed pattern thereon is assembled with a female mold (defining the anterior surface of a contact lens), which is filled with a polymerizable lens material. Polymerization is initiated and a colored contact lens is produced in step 315. After making one colored contact lens, a new male mold can be inserted into the printing apparatus in step 416 to restart a printing process as described above.

EXAMPLE 2

This example illustrates the mass production of colored contact lens, Freshlook™, in an industrial setting according to a preferred embodiment of the invention.

Figure 4:
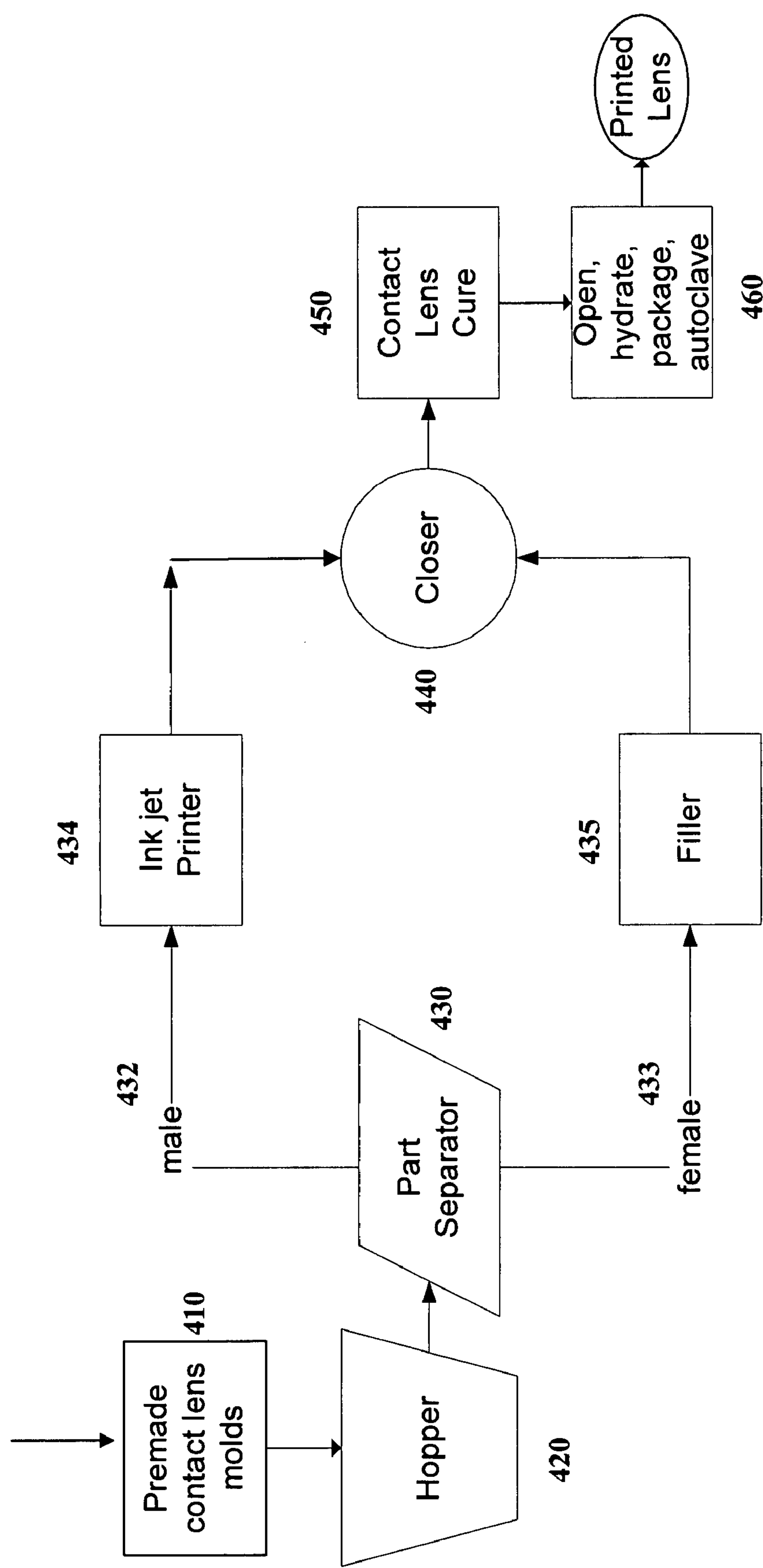
FIG. 4 is a schematic flow diagram of a manufacturing process line for mass-production of FreshLook™ (CIBA Vision) contact lenses according to a preferred embodiment of the invention.

FIG. 4 is a schematic flow diagram of a manufacturing process line for mass-production of FreshLook™ (CIBA Vision) contact lenses. Molds 410 for making contact lenses are transported into a hopper 420 which separates and places the male and female mold portions onto separate carrier pallets (male 432 and female 433) for rapid transport of multiple mold portions to the subsequent staging areas in the manufacturing line. Each of female mold portions is filled in a Filler 435 with enough lens material to make a contact lens and sent to the closing area 440. Each of male mold portions is sent to the ink jet printing station 434 (described below), where an inversion or iris pattern or both are jetted onto each of the male mold portions. Each of the male mold portions is then assembled tightly with one female mold portion containing lens material. Polymerization of the lens material is initiated with an energy source, such as UV, thermal, or e-beam energy, to form a contact lens in a curing station 450. The polymerized contact lenses are then demolded, hydrated, packaged, and autoclaved prior to distribution and shipping of the finished part in step 460.

Figure 5:
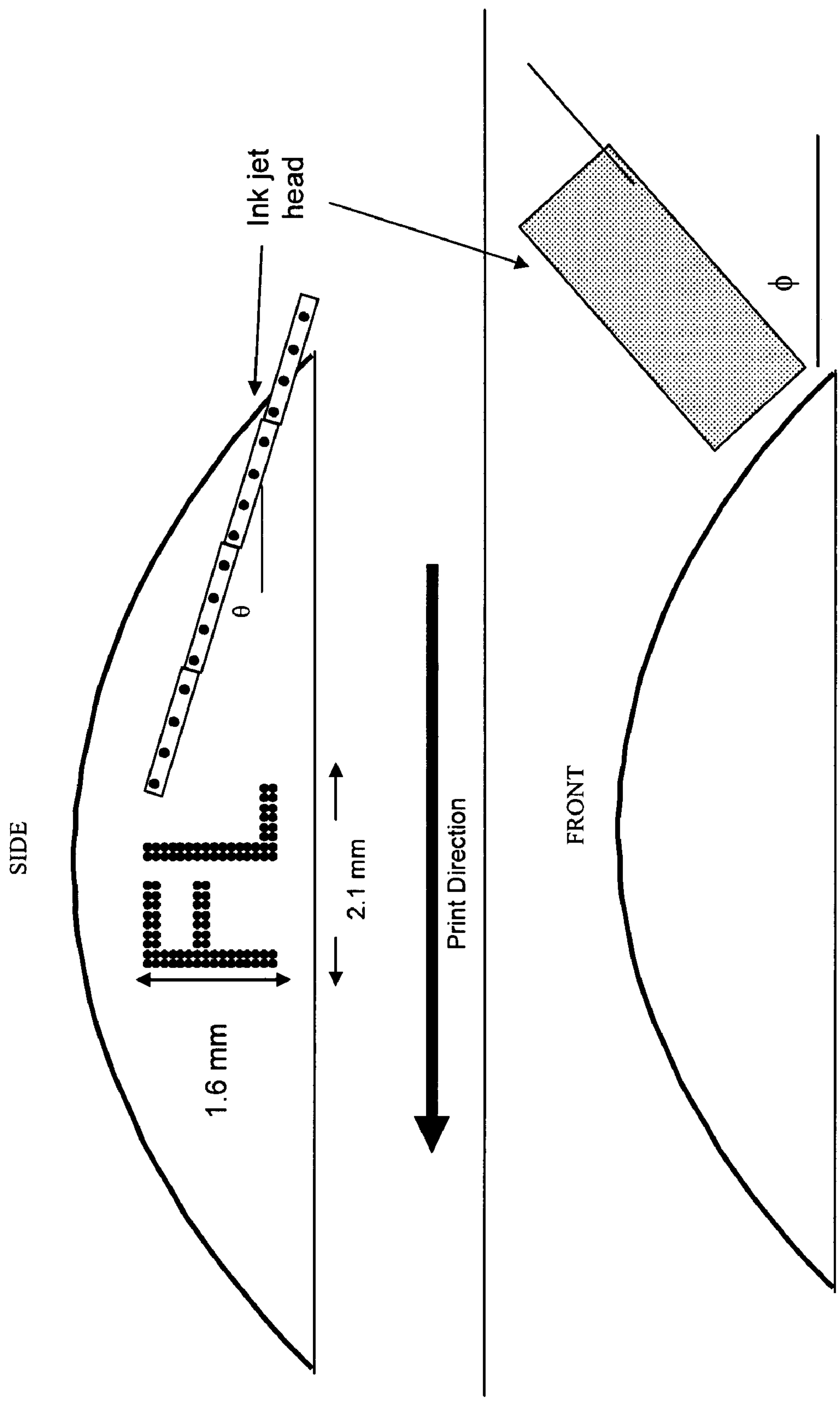
FIG. 5 schematically depicts operation of a printing station incorporated in the manufacturing process schematically shown in FIG. 4.

FIG. 5 schematically shows operation of a printing station used in the above-described manufacturing process line for producing FreshLook™ (CIBA Vision) contact lenses. A multi-nozzle inkjet head 510 is positioned over the male mold portion to allow jetting of inks compatible with this lens material (see co-pending U.S. patent application Ser. No. 10/287,730, "Ink Formulations and Uses Thereof", herein incorporated by reference in its entirety). As a male mold portion is passed under the ink jet head, a timed sequence of pulses is applied to the ink jet head. This timed sequence is generated from a computer using commercial ink jet software, which is subsequently amplified to allow firing of the piezoelectric nozzles. Since the mold is moving under the head at a constant velocity, the series of "jet" and "no-jet" pulses allow complex patterns to be reproduced onto the contact lens mold.

The quality of the image depends upon many parameters that are a property of the ink jet head, such as the ink jet nozzle diameter, pulse sequence, and ink jet channel distance. Some image quality features can be controlled by orientation and positioning of the ink jet head. The head must be brought as close as possible to the mold or lens surface to reduce effects from any possible satellites and ligaments formed. This distance can be minimized by fixing the head tangent to the contact lens surface by tilting the head at some angle $\phi$ with respect to the center axis of the lens, as shown in the front view of FIG. 5. In some cases, as when printing a complete iris pattern, this angle is kept at 90° to allow printing of the entire contact lens.

The resolution and print height of the print is adjusted by controlling the print angle $\theta$ (see FIG. 5, side view), as well known by those known in the art. At maximum print angle ($\theta$=90°), the print height is maximal and equal to the print head width. The drop spacing is equal to the nozzle pitch. As the print angle decreases, the resolution (drops per inch) increases, but the print height decreases.

A lens or mold portion is slid at a constant velocity under the print head. A position sensor indicates when the mold has entered the printing area, and a certain time is allowed to elapse to begin printing in the iris area of the lens. The individual piezoelectric heads fire in a controlled pattern to form the first column of print. After another constant delay, the second column of print is fired. This process continues with a constant time delay between rows until the entire print pattern is reproduced. A specific example of a possible inversion mark is shown in FIG. 5.

Alternatively, a lens or mold portion is slid under the print head at a variable velocity. A position sensor indicates when the mold has entered the printing area, and molds are allowed to slide a certain distance before printing the first column of the image, as measured by a digital shaft encoder (i.e. Accucoder). After another constant slide distance, the second column of print is fired. The process continues with a constant distance between rows until the entire print pattern is reproduced.

EXAMPLE 3

This example illustrates an inkjet printing system according to a preferred embodiment of the invention.

Figure 6:
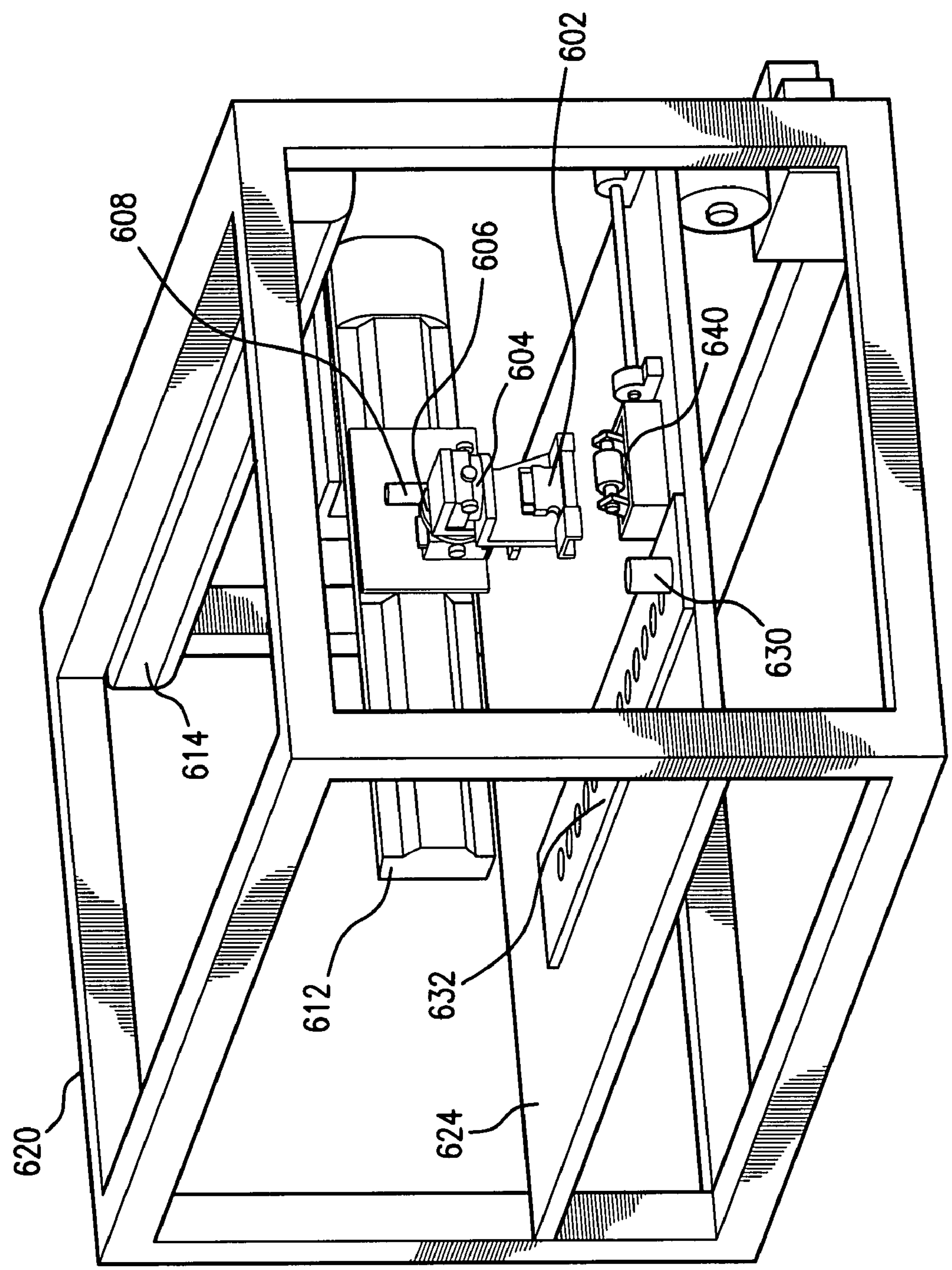
FIG. 6 schematically illustrates an inkjet printing system according to a preferred embodiment of the invention.

FIG. 6 schematically shows an inkjet printing system according to a preferred embodiment of the invention. The system comprises an inkjet printer head 602, which is connected to one or more ink reservoirs (not shown). Ink supply, pressure and flow are controlled by a computer system.

The inkjet printer head 602 (e.g., a XJ126 200 dpi inkjet head from Xaar) is mounted by mechanical fixtures known to a person skilled in the art onto a positioning system, which includes 2 rotary fixtures 604 and 606 (e.g., two 2" rotary stages from Parker/Edmund Industrial), up-down linearly moving fixture 608 (e.g., a metric micrometer from Parker/Edmund Industrial), a first linear actuator 612 (e.g., a linear actuator, 300 mm stage from Intelligent Actuator) and a second linear actuator 614 (e.g., a linear actuator, 300 mm stage from Intelligent Actuator). The first and second linear actuators 612 and 614 are perpendicular to each other and are mounted onto a frame 620.

Positioning of the inkjet printer head 602 is achieved by the rotary fixtures 604 and 606, up-down linearly moving fixture 608 (e.g., a metric micrometer from Parker/Edmund Industrial) and the linear actuators 612 and 614 under control of the computer system. The rotary fixture 604 controls tilting angle of the printer head 602. The rotary fixture 606 controls the rotation of the printer head 602. The up-down linearly moving fixture 608 controls the movement of the printer head 602 linearly in the vertical axis (z-axis). The x-y position in a horizontal plane of the printer head 602 is controlled by the first and second linear actuators. Position can be further monitored through use of a shaft encoder (not shown).

A mold 630 to be printed is placed in a transport means 632 which hold one or more molds. The transport means is placed on a support 624 which fixed onto the frame 620.

The system comprises one or more product detecting systems (not shown) which detect if a mold is ready to be printed and provide feedback to the computer system to initiate sequential operation of the printing system.

The system also comprises a maintenance subsystem 640 which wipes the printer head 602 whenever dry ink needs to be removed. This system is controlled by pneumatic actuators. For example, a maintenance subsystem can include wipe blades (e.g., from McMaster Carr), wiper box, pneumatic swivel (e.g., from Festo). The printer head ejects any dried ink and primes the ink flow, then is wiped by the wiper blades or cloth to leave a clean surface. The wiper blades would be wiped in the wiper box when the wiper blades are rotated out of the printing box by the pneumatic swivel.

Operation of the system is controlled by the computer system (not shown). An inkjet pattern is controlled by, for example, the Xaar UIE (universal image engine) plus software included with the evaluation kit. The inkjet pattern is downloaded to the inkjet printer head prior to running. This software also controls the timing between the product detect (PD) signal and the actual start of firing. The print head can also be accessed using the Print head Commander software to measure print head temperature and to change the efficiency factor.

The motion control and maintenance is controlled by, for example, SEL Win controller, which programs the IA Super SEL controller E. The Super SEL controller is a 32 bit RISC CPU with CMOS RAM battery backup memory.

Once the Xaar print head and the Super SEL controller are activated, the system runs nearly automatically. The Super SEL tells the linear actuators to move over molds at a constant velocity. The PD triggers the Xaar printer head once a mold is detected. After the programmed delay, the Xaar printer head begins firing the first column of drops. The image is printed at a programmed frequency (typically about 1000 Hz). The x-directional spacing of the image is controlled by the firing frequency and the printer head velocity, while the y-directional spacing is controlled by the nozzle pitch (e.g., 126 μm between each nozzle) and the tilt of the print head. Each image is printed after every PD is observed.

After all molds are printed, new molds can be placed under the printer head to be printed. It should be understood that molds can be automatically transported into the inkjet printing system by using a transport means known to a person skilled in the art.

Alternately, the system can be actuated to move the linear actuators over the molds. The PD triggers the Xaar printer head once a mold is detected. The linear actuator moves a certain distance, as determined by the shaft encoder, where the Xaar printer head begins firing the first column of drops. Subsequent columns of drops are in the x-direction is controlled by the shaft encoder. The y-directional spacing is controlled by the nozzle pitch and the tilt of the print head. The print image is repeated after every PD.

About a certain number of printing actions (for example, after 30 prints), the printer head needs to be purged of any dried ink and wiped. The printer head would have to go by the maintenance station. The printer head would move over a spittoon, where 15 psi pressure would force the ink out of the nozzles. The wiping system would rotate into the printer head path, and the printer head would be wiped using wiper blades or cloth. The printer head is now ready for subsequent printings. The wiper or cloth could be reused by passing under a wiper blade or cloth or simply discarded. Optionally, the wiping system could be flushed with water.

What is claimed is:

1. A printing apparatus for making colored contact lenses, comprising:

(1) a securing means for holding a contact lens or a portion of a mold for making the contact lens;

(2) a printer head, wherein the printer head comprises one or more nozzles each of which is capable of jetting droplets of color liquid independent of each other under control of a computer system;

(3) a positioning means for precisely positioning the printer head at each of a plurality of predetermined printing positions, one at a time from a first printing position to a last printing position on a curved surface of the contact lens or the mold portion under control of the computer system; and (4) a means for converting a two-dimension color image into a set of printing control signals that control jetting of each of the nozzles at each of the predetermined printing positions on the curved surface of the contact lens or the mold portion to obtain a three dimensional color image on the curved surface, wherein each of the two-dimensional color image and the three-dimensional color image on the curved surface is represented by a matrix of discrete color dots or blended color dots or both, wherein during converting of the two-dimensional color image into the set of the printing control signals, the two-dimensional color image is converted into a three-dimensional color image by projecting the two-dimensional color image onto a hemispherical surface and the density of dots in the three-dimensional color image is kept constant by adding dots or deleting dots or both in the dot matrix of the three-dimensional color image on the curved surface of the article, wherein the positioning means is a motor assembly, wherein the motor assembly moves the contact lens or the mold portion or the printer head along a translational axis, rotates the contact lens or the mold portion or the printer head around a rotational axis that passes through the apical center of the surface of the contact lens or the mold portion in a direction normal to the surface of the contact lens or the mold portion, and tilts the contact lens or the mold portion or the printer head with respect to the rotational axis.

2. A printing apparatus of claim 1, further comprising at least one additional printer head having one or more nozzles, wherein each nozzle is capable of jetting droplets of color liquid independent of each other under control of the computer system.

3. A printing apparatus of claim 1, wherein the printer head comprise at least one column of nozzles.

4. A printing apparatus of claim 3, wherein the positioning means is a motor assembly that can move the contact lens or the mold portion (or the printer head) toward to or away from the printer head (or the contact lens or the mold portion) and can rotate the contact lens or the mold portion (or the printer head) around a rotational axis that passes through the apical center of the surface of the contact lens or the mold portion in a direction normal to the surface of the contact lens or the mold portion.

5. A printing apparatus of claim 4, wherein the column of nozzles covers at least width of an annulus zone on the surface of the contact lens or the mold portion, wherein the center of the annulus zone is the apical center of the surface of the contact lens or the mold portion, wherein a printing area is located within the annulus zone.

6. A printing apparatus of claim 5, wherein the printer head is tilted at an angle with respect to the rotational axis so that the printing surface of the printer head is in parallel with a surface tangent to the annulus zone.

7. An apparatus of claim 6, wherein the printing surface of the printer head has a curvature accommodating the curvature of the surface of the contact lens or the mold portion.

8. An apparatus of claim 4, wherein the printer head is placed perpendicular to the rotational axis, wherein the column of nozzles covers at least the diameter of a circular zone on the surface of the contact lens or the mold portion, wherein the center of the circular zone is the apical center of the surface of the contact lens or the mold portion, wherein a printing area is located within the circular zone.

9. An apparatus of claim 8, wherein the printing surface of the printer head has a curvature accommodating the curvature of the surface of the contact lens or the mold portion.

10. A printing apparatus of claim 3, wherein the positioning means comprises:

a moving means, wherein the moving means can move the contact lens or the mold portion (or the printer head) at a constant velocity under the printer head (or over the contact lens or the mold portion); and a jetting-controlling means for controlling each of the nozzles to dispense drops of color liquid in a timed sequence, wherein time intervals between two drops from each of the nozzles are constant or variable.

11. An apparatus of claim 10, wherein the printer head is placed perpendicular to a rotational axis that passes through the apical center of the surface of the contact lens or the mold portion, wherein the column of nozzles covers at least the diameter of a circular zone on the surface of the contact lens or the mold portion, wherein the center of the circular zone is the apical center of the surface of the contact lens or the mold portion, wherein a printing area is located within the circular zone.

12. A printing apparatus of claim 11, wherein the printing surface of the printer head has a curvature accommodating the curvature of the surface of the contact lens or the mold portion.

13. A method for printing a color image on a contact lens or a portion of a mold for making the contact lens each having a curved surface, comprising under control of a computer system:

(a) converting a two dimensional color image into a set of printing-control signals for printing the color image on the curved surface of the article, wherein each of the two-dimensional color image and the three-dimensional color image on the curved surface is represented by a matrix of discrete color dots or blended color dots or both, wherein during converting of the two-dimensional color image into the set of the printing control signals, the two-dimensional color image is converted into a three-dimensional color image by projecting the two-dimensional color image onto a hemispherical surface and the density of dots in the three-dimensional color image is kept constant by adding dots or deleting dots or both in the dot matrix of the three-dimensional color image;

(b) positioning precisely a printer head at each of a plurality of predetermined positions based on the set of printing-control signals, one at a time, on the curved surface of the article while keeping a relatively constant distance between the printer head and the curved surface of the article, wherein the printer head comprises one or more nozzles each of which is capable of jetting droplets of color liquid independent of each other; and (c) dispensing one or more drops of color liquid from the printer head, one drop from one nozzle, on the curved surface of the article at each of the predetermined positions so as to produce the color image on the curved surface of the article.

14. A method of claim 13, wherein the printer head comprise at least one column of nozzles.

15. A method of claim 13, wherein the positioning step comprising:

keeping the printer head (or the article) stationary; moving linearly the article (or the printer head) along a translational axis;

rotating the printer head (or the article) around a rotational axis that passes through the apical center of the curved surface of the article in a direction normal to the curved surface; and tilting the rotational axis.

16. A method of claim 13, wherein the positioning step comprises:

moving linearly the article (or the printer head) toward to or away from the printer head (or the article); and rotating the article (or the printer head) around a rotational axis that passes through the apical center of the curved surface of the article in a direction normal to the curved surface.

17. A method of claim 13, wherein the positioning step comprises:

moving the article (or the printer head) at a constant velocity directly under the printer head (or above the article); and generating jetting-control signals to control each of the nozzles to dispense a plurality of drops of color liquid in a timed sequence, one drop at a time and at a constant or variable time interval between two subsequent drops.

* * * * *